March 16, 1954  M. FISCHMAN  2,672,558
PULSE GENERATOR
Filed June 28, 1945
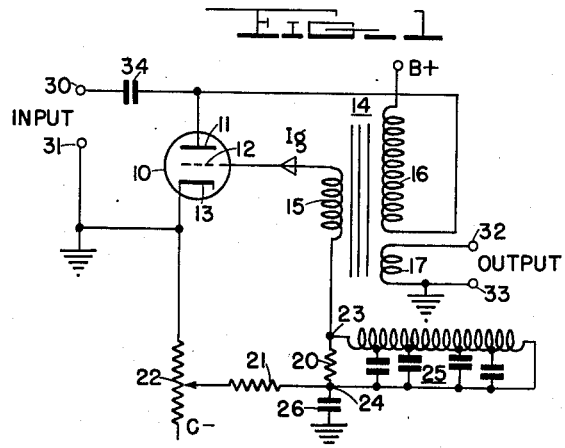
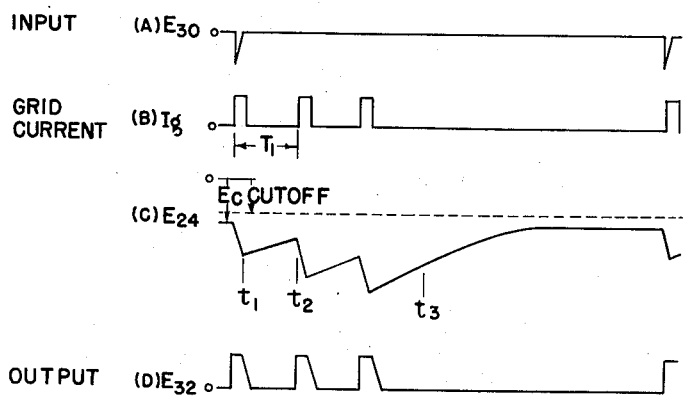
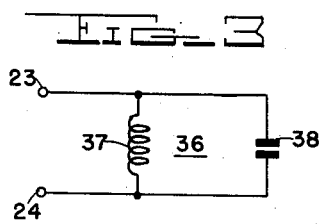
Inventor
MARTIN FISCHMAN
By Ralph L. Chappell
Attorney Patented Mar. 16, 1954

2,672,558

UNITED STATES PATENT OFFICE 2,672,558

PULSE GENERATOR

Martin Fischman, Brooklyn, N. Y., assignor to the United States of America as represented by the Secretary of the Navy Application June 28, 1945, Serial No. 602,146

3 Claims. (Cl. 250—36)

(Granted under Title 35, U. S. Code (1952), sec. 266)

This invention relates to a pulse generator and more particularly to a recurrent pulse generator in which discrete, periodic pulses are initiated by self triggering within the generator.

Numerous pulse generators are known in the art capable of generating a pulse which may consist of a simple pulse of current or voltage or which may constitute the pulse envelope of high frequency oscillations within the pulse.

A common form of pulse generator is of the blocking oscillator type wherein inductive coupling between input and output circuits of a tube is provided to produce a high-current pulse having sharp leading and trailing edges. The aforementioned coupling often comprises a transformer especially designed to transmit pulses having sharp rise and fall. In such pulse generators of the blocking oscillator type, it is customary to connect one of the transformer windings between the control electrode of the tube and the control electrode bias. Another of the transformer windings is connected between the tube anode and a source of anode supply voltage. Output is taken from a third transformer winding.

The operation of such a blocking oscillator as described above is as follows. A triggering pulse is applied to the circuit; this may be either a negative pulse on the anode or a positive pulse on the control electrode. This trigger initiates a slight flow of anode-cathode current. This current, by virtue of the transformer coupling, produces a positive voltage on the control electrode, which causes more anode current to flow, in turn causing a greater positive voltage on the control electrode. The effect is rapidly cumulative until anode-cathode current is limited by circuit characteristics or by regulation of the anode voltage supply or by both. At this point, anode-cathode current starts to decrease, and this rapidly feeds back a negative voltage to the control electrode, which quickly cuts off the pulse of current. Thus, for every external input pulse, which may be of low power magnitude, there is derived at the output winding a high power pulse having sharp leading and trailing edges and having a duration determined by the parameters of the circuit, i. e., tube and transformer characteristics, anode supply regulation, and the like.

Under certain circumstances it may be desired that a single input pulse produce not one, but a plurality of output pulses, spaced apart a predetermined time interval. It is also often desirable that, following production of a predetermined number of such plural pulses, the generator automatically cease operation and remain quiescent until receipt of another input pulse.

It is, accordingly, an object of this invention to produce a pulse generator in which a single input pulse will initiate generation of a plurality of output pulses spaced apart by a predetermined time interval.

It is another object of this invention to produce a pulse generator capable of generating a predetermined number of discrete pulses before automatically terminating such generation.

It is a further object of this invention to produce a pulse generator which will generate a group of pulses consisting of a predetermined number of discrete pulses spaced apart a predetermined time interval and which will remain ineffective to generate additional groups of pulses for a predetermined time after termination of any given pulse group.

In accordance with these objects, this invention comprises a blocking oscillator arranged as described above, and having in its circuit an energy storage means. A portion of the energy generated upon the creation of each discrete pulse is stored in the energy storage means for a predetermined time, following which it reappears to trigger the control electrode of the tube. Another discrete pulse is thus instituted in the blocking oscillator, whereupon the process is repeated.

In order to terminate generation of the pulses set in operation by the action of the energy storage means described above, a variable biasing means is also placed in the control electrode circuit whereby the negative bias on the control electrode is augmented with each discrete pulse generated until a point is reached at which the triggering voltage applied by the energy storage means is insufficient to produce further pulses. At this point, pulse generation ceases, and the generator remains quiescent until the variable negative bias has reduced to a point where receipt of a next external triggering voltage reinstitutes another group of pulses.

Detailed operation together with further objects of this invention will be better understood by reference to the drawings in which:

Fig. 1 shows the blocking oscillator circuit embodying this invention,

Fig. 2 shows certain wave forms helpful in understanding operation of the circuit of Fig. 1 and consists of curves 2(A), 2(B), 2(C) and 2(D), and Fig. 3 shows an alternative circuit means which may replace one of the circuit means of Fig. 1.

Referring to Fig. 1, there is shown a blocking oscillator comprising a tube 10, having anode 11, control electrode 12, and cathode 13. Associated with tube 10 is a pulse transformer 14, having windings 15, 16 and 17. Winding 15 is connected between control electrode 12 and the control electrode bias C—, through resistors 20 and 21 and potentiometer 22, by means of which the control electrode bias may be varied manually. Between terminals 23 and 24 of resistor 20 is connected a delay line or wave filter element 25. Delay line 25 constitutes an energy storage means serving to trigger the oscillator at a predetermined rate as will be explained more fully hereinafter.

Connected between terminal 24 and ground is a capacitor 26, which serves as a biasing means for increasing the negative bias on the control electrode 12 with each pulse until the pulse generator is finally biased to the point where triggering voltage will not institute a pulse of anode current. This will be explained more fully hereinafter.

Anode 11 is connected to a source of supply voltage B+ through winding 16 of transformer 14. Cathode 13 is grounded as shown. Terminals 30 and 31 constitute input terminals for the generator, the latter being connected to ground, and the former to anode 11 through isolating capacitor 34. At the ends of winding 17 of transformer 14, are output terminals 32 and 33.

The operation of the circuit of Fig. 1 will now be described with reference to Fig. 2, illustrating symbolically various wave forms present throughout the circuit. An input pulse is applied between terminals 30 and 31 as shown in Fig. 2(A) wherein $E_{30}$ represents the voltage between ground and point 30. This triggering "spike" initiates a pulse of anode current which is quickly amplified by virtue of the coupling between control electrode and anode, and a pulse of grid current, $I_g$ is drawn, as shown in Fig. 2(B). This pulse of grid current produces a negative voltage pulse between terminals 24 and 23, which travels down delay line 25 and returns with reversed polarity by virtue of the short-circuit at the end of delay line 25. When the returning pulse of voltage, now of positive polarity, reaches resistor 20, a positive voltage pulse is applied to the control electrode circuit and the oscillator is again triggered. The succeeding flow of grid current reinstitutes a negative pulse which travels down and back delay line 25 in the manner similar to that of the first pulse. With each pulse thus generated, there appears at the output terminals 32, 33 a discrete pulse of voltage as shown in Fig. 2(D).

The recurrent pulses thus initiated would continue indefinitely were it not for the biasing means comprising resistor 21 and capacitor 26. The function of capacitor 26 in the operation of the pulse generator will be understood by reference to Fig. 2(C), wherein the voltage between ground and point 24 is illustrated. As shown, this voltage is originally equal to the static, control electrode biasing voltage $E_c$. This bias is greater than cut-off and blocks tube current until overcome by a triggering pulse, which is originally the input "spike" $E_{30}$. As explained before, $E_{30}$ produces a first pulse of grid current $I_g$, which in addition to starting a negative pulse down delay line 25, also charges condenser 26, increasing the negative bias on control electrode 12. At time $t_1$ in Fig. 2(C), the first pulse of control electrode current $I_g$ has terminated, after charging capacitor 26 and increasing the negative bias as shown. The charge on capacitor 26 leaks off through resistor 21 between times $t_1$ and $t_2$. At time $t_2$, the first pulse of grid current, having returned to resistor 20, overcomes the control electrode bias in the manner that the original input pulse $E_{30}$ overcame the bias, and a second pulse is initiated. This process is repeated cyclically until the time $t_3$, when the third pulse in the delay line returning to resistor 20 is unable to overcome the progressively increasing negative bias on capacitor 26 and pulse generation ceases.

It will be apparent that the time interval $T_1$ between pulses, shown in Fig. 2(B), is equal to the time required for a pulse to travel down delay line 25 and back again.

In a specific circuit which was constructed and operated satisfactorily, the following parameters were used:

Tube 10 _____ 6L6.
Transformer 14 ___ 30 turns, each winding.
Delay Line 25 _____ 10 microseconds, total delay both ways.
Resistor 20 _____ 500 ohms.
Capacitor 26 _____ .002 microfarad.
Resistor 21 _____ 33,000 ohms.
Potentiometer 22 __ 50,000 ohms.
B+ _____ 250 volts.
C— _____ 105 volts.

An alternative energy storage means to replace delay line 25 is the parallel resonant circuit 36 shown in Fig. 3 and comprising inductor 37 and capacitor 38. With each pulse of control electrode current $I_g$, this circuit responds as a ringing circuit, swinging first negative and then positive. When the positive cycle has reached such a point that the oscillator fires, which point is reached at about ¾ of the LC period, a new pulse is initiated and circuit 36 is again shock excited.

The delay line need not necessarily be placed directly in the control electrode-cathode circuit. If desired, an additional winding on transformer 14 may be utilized, to which a short-circuited delay line may be attached. In this case the first pulse reflection from the delay line will apply a negative voltage to the control electrode, and the tube will not be retriggered. This first reflection, encountering an impedance greater than the surge impedance of the line, will be reflected from the transformer in the same polarity, will be reversed at the short circuit, and upon arriving at the transformer 14 for the second time will apply a positive voltage to the control electrode and retrigger the tube. This arrangement has the advantage that the pulse must travel over the delay line four times instead of only twice as described in the first embodiment.

It will be clear that the external triggering pulse $E_{30}$ may be applied either negatively to the anode as described hereinbefore, or positively to the control electrode 12.

From the above description it will be apparent that the time interval $T_1$ between pulses may be made of any duration desired, depending on the delay time of line 25. It will likewise be apparent that the number of pulses in a group may be varied from one to any number desired by proper selection of capacitor 26, while the recovery time required before the generator is receptive to another input pulse may be determined by choice of resistor 21.

Although I have shown and described certain specific embodiments of the invention, I am fully aware of the many modifications possible thereof. This invention is not to be restricted except insofar as is necessitated by prior art and the spirit of the appended claims.

The invention described herein may be manufactured and used by or for the Government of the United States of America for governmental purposes without the payment of any royalties thereon or therefor.

What is claimed is:

1. A pulse group generator comprising, a vacuum tube having at least cathode, anode, and control grid electrodes, said tube being biased normally non-conducting, a source of trigger pulses to initiate conduction therein, a transformer having at least first and second windings, a resistance-capacitance time constant circuit, a delay line shorted at one end and having its other end serially connected with said circuit and said first winding between said grid and said cathode, said first winding being at the control grid end of said series connection, said resistance-capacitance circuit having a time constant greater than the period of said delay line, and said second winding connected in the anode supply path for said tube to couple said anode and control grid in opposite phase.

2. A pulse group generator comprising, a vacuum tube having at least cathode, anode, and control grid electrodes, said tube being biased normally non-conducting, a source of trigger pulses to initiate conduction therein, a transformer having at least first and second windings, a delay line shorted at one end, a resistance and capacitance connected in parallel with each other and in series with the other end of said delay line and said first winding between said cathode and control grid, said first winding being at the control grid end of said series connection, said resistance and capacitance having a time constant greater than the period of said delay line, and said second winding connected in the anode supply path for said tube to couple said anode and control grid in opposite phase.

3. A pulse group generator comprising, a vacuum tube having at least cathode, anode, and control grid electrodes, a negative bias source normally biasing said tube non-conducting, a source of trigger pulses to initiate conduction in said tube, a transformer having at least first and second windings, a delay line shorted at one end, a resistance and capacitance connected in parallel with each other and in series with the other end of said delay line and said first winding between said cathode and control grid, said first winding being at the control grid end of said series connection, said resistance and capacitance having a time constant greater than the period of said delay line, means connecting an intermediate point in said resistance to said bias source, and said second winding connected in the anode supply path for said tube to couple said anode and control grid in opposite phase.

MARTIN FISCHMAN.

References Cited in the file of this patent

UNITED STATES PATENTS

| Number | Name | Date |
|---|---|---|
| 2,235,131 | Wheeler | Mar. 18, 1941 |
| 2,255,403 | Wheeler | Sept. 9, 1941 |
| 2,257,663 | Albrecht | Sept. 30, 1941 |
| 2,292,835 | Hepp | Aug. 11, 1942 |
| 2,373,134 | Massonneau | Apr. 10, 1945 |
| 2,398,771 | Compton | Apr. 23, 1946 |
| 2,417,834 | Lord | Mar. 25, 1947 |
| 2,440,895 | Cawein | May 4, 1948 |
| 2,444,782 | Lord | July 6, 1948 |
| 2,461,110 | Fischman | Feb. 8, 1949 |
| 2,464,259 | Proskauer | Mar. 15, 1949 |
| 2,537,113 | Yost | Jan. 9, 1951 |
| 2,564,000 | Gaffney | Aug. 14, 1951 |